United States Patent
Mikuni et al.

(10) Patent No.: US 7,350,974 B2
(45) Date of Patent: Apr. 1, 2008

(54) TEMPERATURE DETECTION CIRCUIT

(75) Inventors: Takeshi Mikuni, Kawasaki (JP); Akio Tamagawa, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 77 days.

(21) Appl. No.: 11/208,786

(22) Filed: Aug. 23, 2005

(65) Prior Publication Data

US 2006/0056486 A1   Mar. 16, 2006

(30) Foreign Application Priority Data

Sep. 14, 2004   (JP) .............................. 2004-266290

(51) Int. Cl.
   *G01K 7/01*    (2006.01)
   *G01K 7/14*    (2006.01)

(52) U.S. Cl. ...................... 374/178; 702/130; 702/133

(58) Field of Classification Search ................ 374/178, 374/170; 327/512, 513
   See application file for complete search history.

(56) References Cited

U.S. PATENT DOCUMENTS

| | | | | |
|---|---|---|---|---|
| 3,393,870 A | * | 7/1968 | Jeffrey ...................... 236/78 R |
| 3,780,585 A | * | 12/1973 | Milo ........................... 374/178 |
| 3,882,728 A | * | 5/1975 | Wittlinger ................... 374/112 |
| 4,652,144 A | * | 3/1987 | Gunther et al. .............. 327/512 |
| 5,039,878 A | * | 8/1991 | Armstrong et al. .......... 327/512 |
| 5,085,526 A | * | 2/1992 | Sawtell et al. ............... 374/101 |
| 5,162,678 A | * | 11/1992 | Yamasaki .................... 327/331 |
| 5,355,123 A | * | 10/1994 | Nishiura et al. ............. 340/653 |
| 5,914,629 A | * | 6/1999 | Maki ........................... 327/512 |
| 5,918,982 A | * | 7/1999 | Nagata et al. ............... 374/178 |
| 5,993,060 A | * | 11/1999 | Sakurai ....................... 374/178 |
| 6,023,185 A | * | 2/2000 | Galipeau et al. ............. 327/513 |
| 6,255,892 B1 | * | 7/2001 | Gartner et al. ............... 327/512 |
| 6,266,221 B1 | * | 7/2001 | Scilla .......................... 361/103 |
| 7,009,830 B2 | * | 3/2006 | Yamamoto et al. .......... 361/103 |
| 7,010,440 B1 | * | 3/2006 | Lillis et al. .................... 702/65 |
| 7,216,064 B1 | * | 5/2007 | Pippin ............................ 703/1 |
| 2004/0184510 A1 | * | 9/2004 | Tokunaga .................... 374/178 |
| 2005/0105586 A1 | * | 5/2005 | Sato ............................. 374/178 |

FOREIGN PATENT DOCUMENTS

JP            2001-13011         1/2001

* cited by examiner

*Primary Examiner*—Gail Verbitsky
(74) *Attorney, Agent, or Firm*—Young & Thompson

(57) ABSTRACT

A temperature detection circuit according to the present invention includes a potential generating part and a temperature detection part. The potential generating part generates a potential according to an environmental temperature, and the temperature detection part detects a temperature based on a detection potential generated in the potential generated part. The temperature detection part is a resistive load type inverter circuit that outputs a detection signal when the generated potential reaches a threshold voltage. The potential generating part applies the detection potential to the inverter circuit through a temperature sensor including cascaded diodes and an NchMOSFET. The threshold voltage of the inverter circuit is determined based on the NchMOSFET in the inverter circuit, and the NchMOSFET is a MOSFET having the same characteristic as the NchMOSFET of the potential generating part.

9 Claims, 3 Drawing Sheets

RELATED ART

TEMPERATURE DETECTION CIRCUIT

BACKGROUND OF THE INVENTION

1. Field of the Invention

The present invention relates to a temperature detection circuit for compensating an operation of, for example, an oscillator and protecting a semiconductor device from thermal breakdown. In particular, the invention relates to a temperature detection circuit capable of suppressing variations in temperature to be detected.

2. Description of Related Art

FIG. 5 is a circuit diagram showing a conventional temperature detection circuit. As shown in FIG. 5, a conventional temperature detection circuit 101 includes a temperature sensor potential generating part 120 and an inverter circuit 110. The temperature sensor potential generating part 120 is connected between a circuit power source VI and a ground GND to generate a potential according to an environmental temperature. The inverter circuit 110 detects a predetermined temperature based on the potential generated in the temperature sensor potential generating part 120.

The temperature sensor potential generating part 120 includes a resistor R12 and plural diodes D11 to D18 series-connected with the resistor R12 (hereinafter, referred to as cascaded diodes 121). The resistor R12 and the cascaded diodes are connected between the circuit power source VI and the ground GND.

Further, the inverter circuit 110 includes a resistor R11 and an NchMOSFET M11 series-connected with the resistor R11. The resistor R11 and the NchMOSFET M11 are connected between the circuit power source VI and the ground GND.

A node (detection node) N11 between the resistor R12 of the temperature sensor potential generating part 120, and the cascaded diodes 121 is connected with a gate of the NchMOSFET M11 of the inverter circuit 110. Thus, a temperature sensor potential VF at the detection node N11 is applied to the gate of the NchMOSFET M11. A current flowing through the resistor R12 of the temperature sensor potential generating part 120 flows through the cascaded diodes 121 as a constant current. The temperature detection circuit 101 is a temperature sensor that measures a forward voltage drop of the cascaded diodes 121 to thereby detect a temperature change.

FIG. 6 is a graph showing a temperature characteristic of the conventional temperature detection circuit 101 of FIG. 5. In FIG. 6, the vertical axis represents a potential (V), and the horizontal axis represents a temperature (° C.). The cascaded diodes 121 are such that 8 diodes are cascaded. As shown in FIG. 6, the temperature sensor potential VF generated in the cascaded diodes 121 shows negative temperature characteristics. Meanwhile, a threshold voltage Vth of the inverter circuit 110 composed of the resistor R11 and the NchMOSFET M11 shows positive temperature characteristics. The temperature detection circuit 101 detects the temperature at a potential Vdet at a point where characteristic lines of the temperature sensor potential VF and the threshold voltage Vth of the inverter circuit 110 cross each other, as a detection temperature Tdet. That is, when the temperature sensor potential VF reaches or exceeds the threshold voltage Vth of the inverter circuit 110, a detection signal is output from an output VO.

Referring now to FIG. 6, a variation in threshold voltage Vth of the inverter circuit 110 leads to a variation ΔT of the detection temperature Tdet as indicated by the detection potentials Vdet1 and Vdet2. Hence, it is difficult for the conventional temperature detection circuit 101 to accurately detect the temperature. For example, Japanese Unexamined Patent Application Publication No. 2001-13011 (pp. 2-3, FIG. 1) discloses the following temperature detection circuit. That is, the temperature detection circuit disclosed in this publication aims at detecting the same temperature irrespective of various variable factors in a manufacturing process for a device generating an electric signal in accordance with the environmental temperature. This circuit converts the electric signal generated in accordance with the temperature into digital data and then corrects the data. By correcting the digital data, the temperature detection circuit disclosed in this publication can give substantially the same digital output value under the same temperature.

Incidentally, a control circuit and protective circuit for currently popular IPDs (Intelligent Power Device) are made up of a CMOS. The IPD implies a high-performance integrated circuit imparted with various functions, in which a power device adapted to a large current and high voltage, and its control circuit and protective circuit are integrated.

In recent years, in an integrated circuit such as the IPD, a PchMOSFET is omitted for cost reduction, thereby lowering a process cost, and only an NchMOSFET is used to compose the circuit, so the control circuit and the protective circuit are simplified. In this case, when the circuit is configured by the NchMOSFET alone, it is difficult to configure a complicated circuit such as a comparator circuit. Hence, as shown in FIGS. 5 and 6, there is no choice but to adopt the circuit configuration utilizing the threshold voltage of the Nch-MOSFET. The temperature detection circuit is used for detecting, for example, an overheat temperature of the circuit. A variation in threshold voltage of the NchMOSFET largely affects the detection temperature of the temperature detection circuit. In other words, the threshold voltage Vth of the inverter circuit 110 depends on the threshold voltage Vth of the NchMOSFET M11, so the manufacturing variation in threshold voltage Vth increases the variation in detection temperature.

In contrast, in order to adjust the detection result with an aim to reduce the variation in detection temperature as in the temperature detection circuit disclosed in Japanese Unexamined Patent Application Publication No. 2001-13011, for example, it is necessary to store correction data according to each circuit. Further, there is a need for an arithmetic circuit for computing corrected data from the correction data based on the detection data. The more complicated process for manufacturing the detection circuit leads to an increase in circuit size, resulting in a higher manufacturing cost rather than cost reduction.

SUMMARY OF THE INVENTION

A temperature detection circuit according to the present invention includes: a potential generating part generating a potential corresponding to a detection temperature; and a temperature detection part detecting a temperature based on a generated potential in the potential generating part, wherein the temperature detection part includes a detection device composed of a semiconductor device detecting a temperature based on the generated potential, and the potential generating part includes a semiconductor device having substantially the same characteristic as the detection device.

According to the present invention, the semiconductor devices of substantially the same characteristics are provided to a potential generating part and a temperature detection part. For example, if the detection temperature of the temperature detection part varies due to a variation in characteristic of the semiconductor device, the potential generating part includes the semiconductor device of the same characteristic, so the generated potential involves substantially the same variation. As a result, variations between manufacturing conditions etc. for semiconductor devices are cancelled out. Thus, the variation in detection temperature can be dramatically minimized as compared with the case where the semiconductor device is provided to the temperature detection part alone.

Consequently, it is possible to provide a temperature detection circuit which is capable of suppressing variations in detection temperature regardless of the variations between manufacturing conditions for devices constituting the circuit to suppress variations in detection temperature, and which is high in detection accuracy with a simple configuration. Further, if the semiconductor devices of the same characteristics are manufactured through the same process, for example, it is possible to provide a temperature detection circuit high in detection accuracy at an extremely low cost in a simple manner.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED
EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Hereinafter, embodiments of the present invention are described in detail with reference to the accompanying drawings. The embodiment is such that the present invention is applied to a temperature detection circuit capable of detecting an excess of the environmental temperature etc. for compensating an operation of a semiconductor device mounted to, for example, an IPD etc., or an oscillator.

Figure 1:
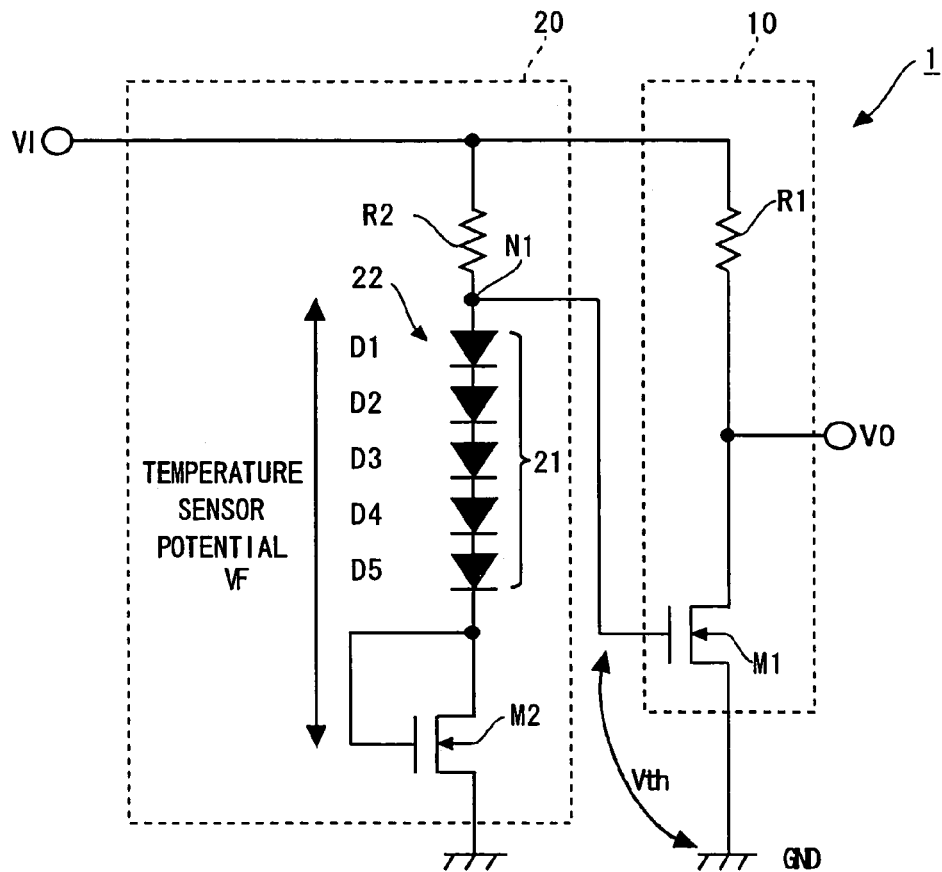
FIG. 1 is a circuit diagram showing a temperature detection circuit according to a first embodiment of the present invention.

FIG. 1 is a circuit diagram showing a temperature detection circuit according to a first embodiment of the present invention. As shown in FIG. 1, the temperature detection circuit 1 according to this embodiment includes a temperature sensor potential generating part 20 and an inverter circuit 10. The temperature sensor potential generating part 20 is connected between a circuit power source VI and a ground GND, and generates a potential according to an environmental temperature. The inverter circuit 10 detects the temperature based on a predetermined temperature sensor potential generated in the temperature sensor potential generating part 20.

The temperature sensor potential generating part 20 includes a constant current source connected with a circuit power source VI and a temperature sensor 22 supplied with current from the constant current source, and is provided between the circuit power source VI and the ground GND. In this embodiment, a resistor R2 is used as the constant current source. Further, used as the temperature sensor are plural diodes D1 to D5 (hereinafter, referred to as cascaded diodes 21) series-connected with the resistor R2 and a semiconductor device M2 series-connected with the cascaded diodes 21.

In this embodiment, the resistor R2 is used as the constant current source. Instead, any circuit composed of a semiconductor device etc. may be used insofar as the circuit can supply a constant current. Alternatively, a constant current may be supplied from the outside. If a stable constant current can be supplied from the constant current source or the outside, the temperature characteristics of the temperature sensor 22 can be more optimized. Further, the cascaded diodes 21 are such that the 5 diodes D1 to D5 are connected in series. However, the number of diodes is not limited to 5 but may be 1 or more. The temperature sensor potential VF at an anode of the cascaded diodes 21 can be set based on an amount of a current IF flowing thorough the resistor R2, and the number of diodes, as appropriate. The temperature sensor potential VF is determined according to the environmental temperature, and its detailed description is given below.

The inverter circuit 10 includes a resistor R1 and a semiconductor device M1 series-connected with the resistor R1 as a detection device, and is provided between the circuit power source VI and the ground GND. In this embodiment, the semiconductor device M1 of the temperature sensor 22 and the detection device M2 of the inverter circuit 10 are composed of semiconductor devices of almost the same characteristics. That is, assuming that the semiconductor device as the detection device of the inverter circuit 10 is, for example, an N-channel MOSFET (metal-oxide semiconductor field-effect transistor) (hereinafter, referred to as NchMOSFET M1), the semiconductor device M2 of the temperature sensor potential generating part 20 is an NchMOSFET (hereinafter, referred to as NchMOSFET M2) having similar characteristics. The NchMOSFET M2 has short-circuited gate and drain, and is connected between the cascaded diodes 21 and the ground GND.

In this embodiment, the inverter circuit 10 and the temperature sensor potential generating part 20 are made up of the NchMOSFET M1 and the NchMOSFET M2, respectively, as semiconductor devices. However, any semiconductor devices of almost the same characteristics can be used. For example, P-channel MOSFETs can be used. From the viewpoint of eliminating the variation in threshold voltage due to a difference in manufacturing condition etc., the NchMOSFET M1 and NchMOSFET M2 are preferably manufactured with the same process in addition to the same design. If the NchMOSFET M1 and NchMOSFET M2 are manufactured through the same process, the devices can have almost the same characteristics, and a manufacturing cost can be reduced.

A node (detection node) N1 between the resistor R2 and the cascaded diodes 21 is connected with a gate of the NchMOSFET M1 of the inverter circuit 10.

In the temperature sensor potential generating part 20 of the temperature detection circuit 1 thus configured, a constant current flows from the resistor R2 to the cascaded diodes 21. As a result, a forward voltage drop occurs at the anode of the cascaded diodes 21. The temperature sensor 22 detects the temperature according to the temperature sensor potential VF at the detection node N1 to thereby detect a target temperature.

Further, the temperature sensor potential VF at the node (detection node) N1 of the temperature sensor potential generating part 20 is applied to the gate of the NchMOSFET M1. When the temperature sensor potential VF applied to the gate of the NchMOSFET M1 exceeds the threshold voltage Vth of the NchMOSFET M1, the temperature detection circuit 1 outputs a detection signal from the output VO. In this way, the temperature detection circuit 1 outputs a detection signal from the inverter circuit 10. That is, the inverter circuit 10 detects the temperature sensor potential VF equal to the threshold voltage Vth of the NchMOSFET M1 as a detection potential Vdet, and outputs the detection signal. Thus, the temperature detection circuit 1 detects a detection temperature Tdet corresponding to the detection potential Vdet.

Figure 2:
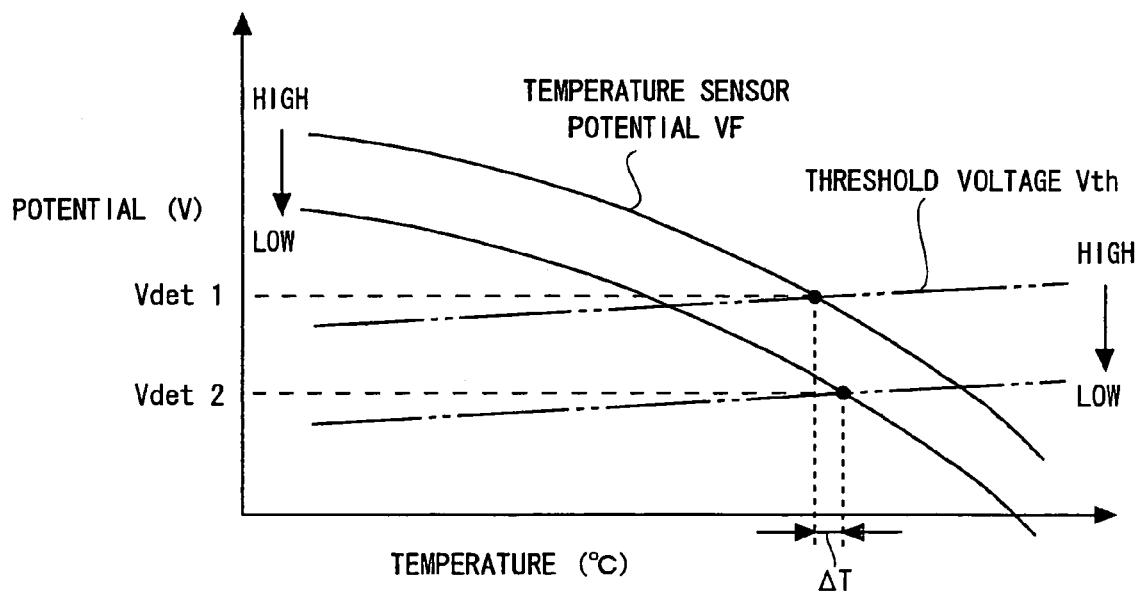
FIG. 2 is a graph showing temperature characteristics of a temperature sensor potential generating part and an inverter circuit of the temperature detection circuit according to the first embodiment of the present invention.

FIG. 2 is a graph showing temperature characteristics of the temperature sensor potential generating part and the inverter circuit in the temperature detection circuit according to this embodiment as shown in FIG. 1. In FIG. 2, the vertical axis represents a level of the temperature sensor potential VF and the threshold voltage of the inverter circuit 10, and the horizontal axis represents a temperature (° C.). In the temperature sensor potential generating part 20 of the temperature detection circuit 1 according to this embodiment, cascaded diodes 21 consisting of diodes, and the NchMOSFET M2 generate the temperature sensor potential VF. As shown in FIG. 2, the temperature sensor potential VF shows negative temperature characteristics. The higher the temperature, the lower the temperature sensor potential VF. On the other hand, the threshold voltage Vth of the inverter circuit 10 shows positive temperature characteristics. The higher the temperature, the higher the threshold voltage Vth.

The temperature (overheat detection temperature) Tdet detected by the temperature detection circuit 1 corresponds to the potential Vdet at a point where characteristic lines of the temperature sensor potential VF and the threshold voltage Vth of the inverter cross each other. That is, the temperature detection circuit 1 is so configured that the inverter circuit 10 outputs the detection signal when the detection temperature Tdet is detected.

Here, the threshold voltage Vth of the inverter circuit 10 in the temperature detection circuit 1 according to this embodiment may vary depending on the manufacturing conditions etc. of the NchMOSFET M1, as shown in FIG. 2. Meanwhile, the temperature sensor potential generating part 20 includes the NchMOSFET M2 together with the cascaded diodes 21 as the temperature sensor 22. The NchMOSFET M2 has almost the same characteristics such as a threshold voltage as the NchMOSFET M1 used in the inverter circuit 10 by being manufactured through the same process. Therefore, the temperature sensor potential VF at the detection node N1 of the temperature sensor potential generating part 20 involves a variation equivalent to the variation in threshold voltage Vth of the NchMOSFET M2 of the inverter circuit 10. As a result, the detection temperatures Tdet at the potentials Vdet at points where characteristic lines of the temperature sensor potential VF and the threshold voltage Vth of the inverter circuit 10 cross each other are as indicated by Vdet1 and Vdet2, for example. Thus, the variation ΔT in detection temperature can be minimized.

That is, the semiconductor devices differ from each other in threshold voltage etc., due to a difference in manufacturing process. This makes it difficult to precisely control their characteristics. In particular, from the viewpoint of cost reduction, a PchMOSFET is omitted, for example, to lower a process cost, and a circuit is configured by only NchMOSFET. In such a case, the temperature detection part utilizes the threshold voltage of the NchMOSFET M1 as in the inverter circuit 10 of this embodiment. In general, the threshold voltage Vth of the NchMOSFET M1 varies. However, if the temperature sensor potential VF generated in the temperature sensor 22 varies likewise, their variations are cancelled out, and the variation ΔT of the detection temperature Tdet due to the variation in threshold voltage Vth of the NchMOSFET M1 can be suppressed.

Further, if the temperature detection part is designed as a simple configuration like an inverter circuit etc. utilizing the threshold voltage of the MOSFET with an aim to reduce a manufacturing cost, the detection temperature varies as mentioned above. If the variations in detection result are corrected for reducing the temperature variation, the circuit configuration is complicated, resulting in a higher manufacturing cost rather than cost reduction in some cases. In contrast, in this embodiment, such a variation in detection temperature can be minimized with an extremely simple circuit configuration in which the semiconductor device almost the same as the semiconductor device used in the inverter circuit 10 is provided to the temperature sensor 22. Also, in order to obtain the semiconductor devices of the same characteristics, the semiconductor devices have only to be manufactured through the same process, for example. If the devices are manufactured through the same process, the manufacturing cost can be further reduced.

Figure 3:
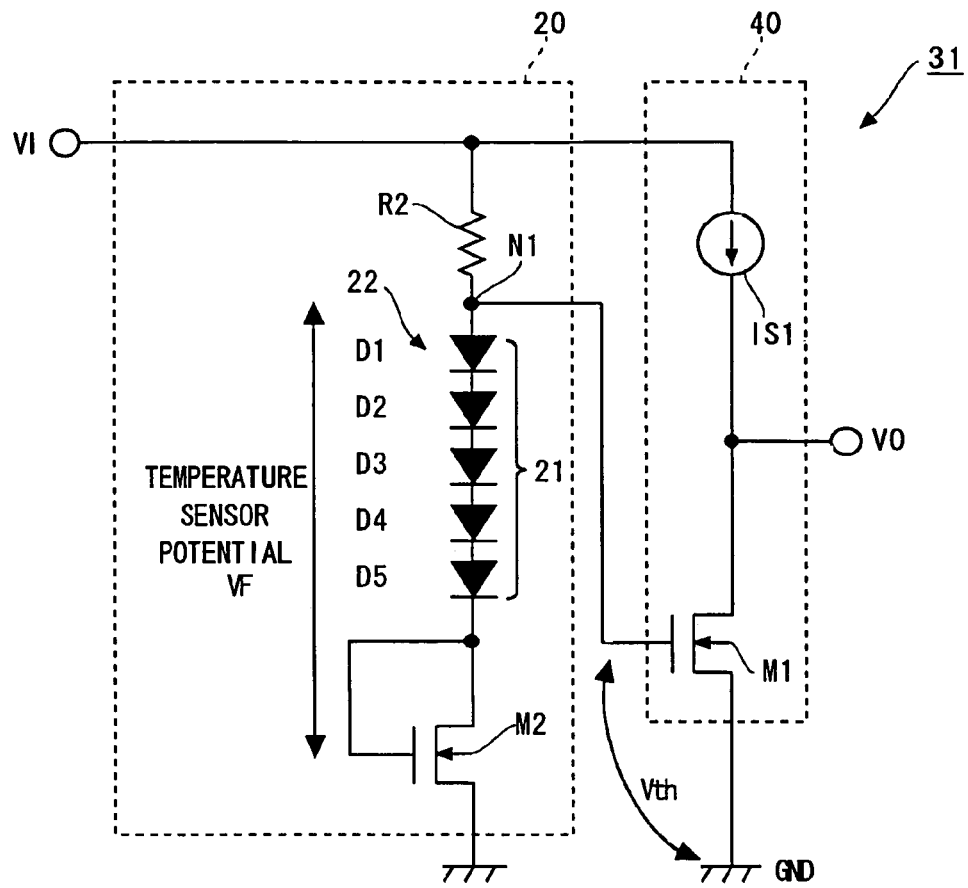
FIG. 3 is a circuit diagram showing a temperature detection circuit according to a second embodiment of the present invention.

Next, a second embodiment of the present invention is described. This embodiment is the same as the above first embodiment except that the inverter circuit is a constant-current load type inverter circuit instead of the resistive load type inverter circuit 10 of the first embodiment. That is, a constant current source IS1 replaces the resistor R1. FIG. 3 is a circuit diagram showing a temperature detection circuit according to this embodiment. In this embodiment shown in FIG. 3, the same components as those of the first embodiment shown in FIG. 1 are denoted by like reference numerals, and their detailed description is omitted here.

As shown in FIG. 3, a temperature detection circuit 31 according to this embodiment includes the temperature sensor potential generating part 20 and an inverter circuit 40. The temperature sensor potential generating part 20 and the inverter circuit 40 are parallel-connected between the circuit power source VI and the ground GND. The temperature sensor potential generating part 20 has the same configuration as the first embodiment, and includes the resistor R2 and temperature sensor 22 connected between the circuit power source VI and the GND. The temperature sensor 22 includes the cascaded diodes 21 consisting of the diodes D1 to D5, and the NchMOSFET M2 having the short-circuited gate and drain. Further, the inverter circuit 40 includes the constant current source IS1 and the NchMOSFET M1. The constant current source IS1 and the NchMOSFET M1 are connected between the circuit power source VI and the GND. Then, the detection node N1 as a node between the resistor R2 of the temperature sensor potential generating part 20 and the temperature sensor 22 is connected with the gate of the NchMOSFET M1. The NchMOSFET M1 is driven with the temperature sensor potential VF at the detection node N1.

In this embodiment as well, the current IF flowing through the resistor R2 causes a voltage drop in the temperature sensor 22, and the temperature sensor potential VF is generated at the detection node N1. If the temperature sensor potential VF exceeds the threshold voltage Vth of the NchMOSFET M1, a detection signal is output from the output VO to detect the detection temperature Tdet.

The temperature sensor potential generating part 20 and the inverter circuit 40 in the temperature detection circuit 31 show temperature characteristics similar to those of the first embodiment as shown in FIG. 2. That is, the temperature sensor potential VF generated by the cascaded diodes 21 and the NchMOSFET M2 in accordance with the environmental temperature etc. shows negative temperature characteristics, and the threshold voltage Vth of the inverter circuit 40 composed of the constant current source IS1 and the NchMOSFET M1 shows positive temperature characteristics. The detection temperature Tdet corresponds to the potential Vdet at a point where characteristic lines of the temperature sensor potential VF and the threshold voltage Vth of the inverter circuit cross each other.

In this embodiment, the temperature characteristics of the constant current source IS1 are adjusted to thereby optimize the temperature characteristics of the threshold voltage Vth of the inverter circuit 40 and further suppress the variations in detection temperature.

Figure 4:
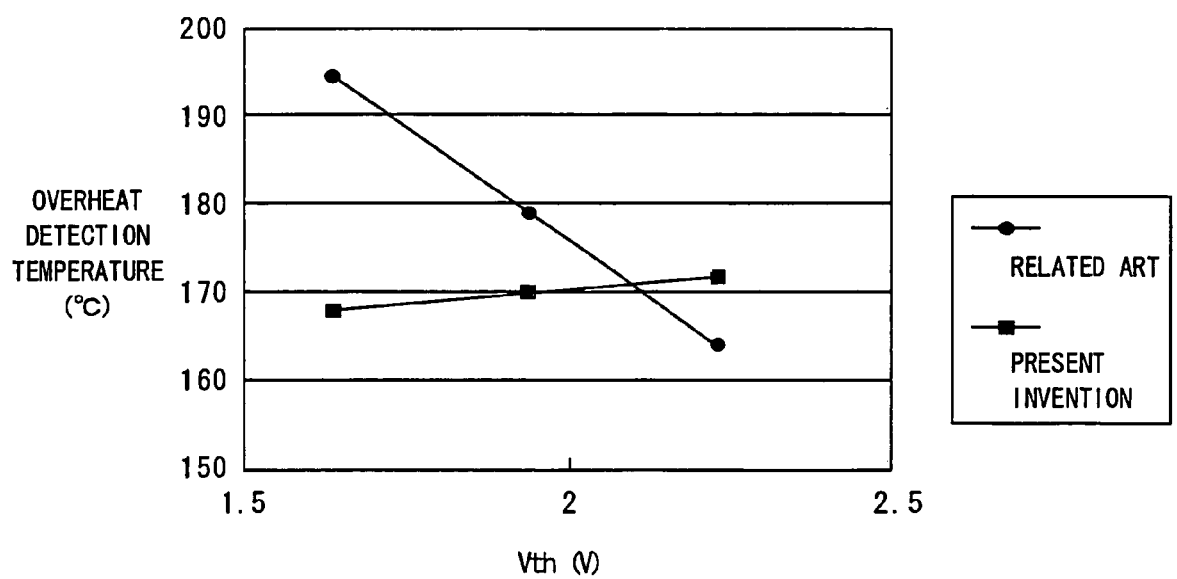
FIG. 4 is a graph showing comparison results of variations in detection temperature between the first embodiment of the present invention and a conventional temperature detection circuit shown in FIG. 5.
Figure 5:
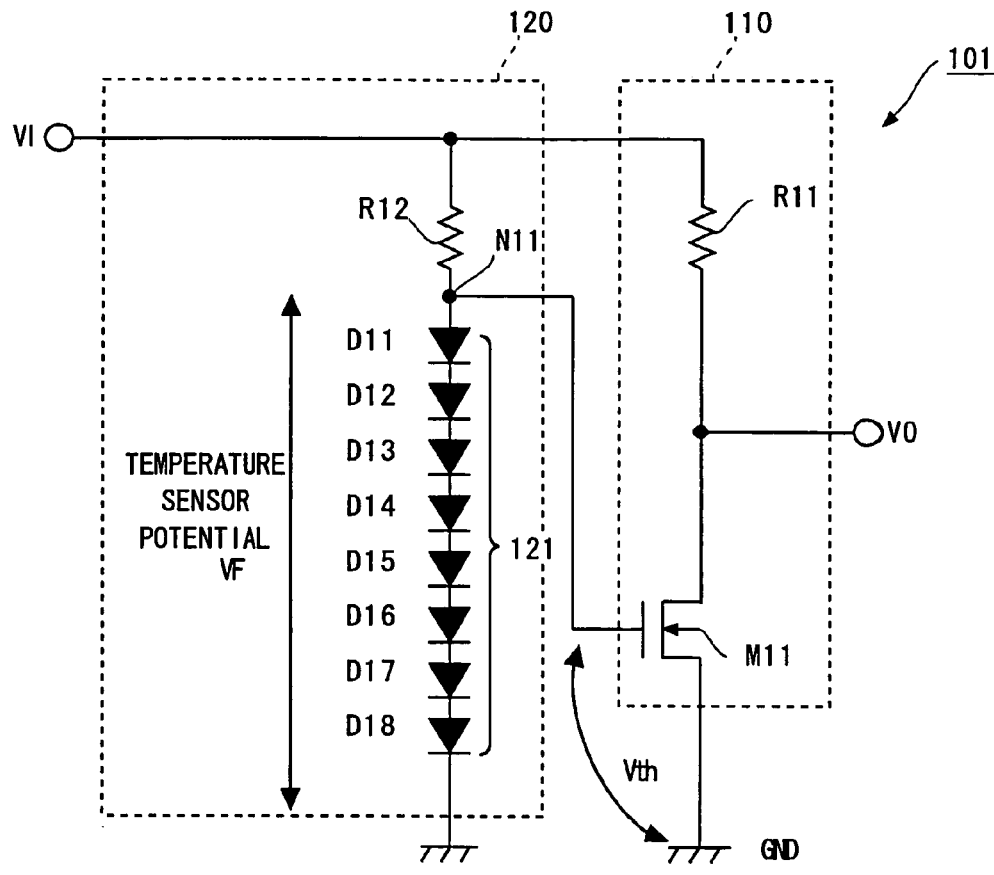
FIG. 5 is a circuit diagram showing the conventional temperature detection circuit.
Figure 6:
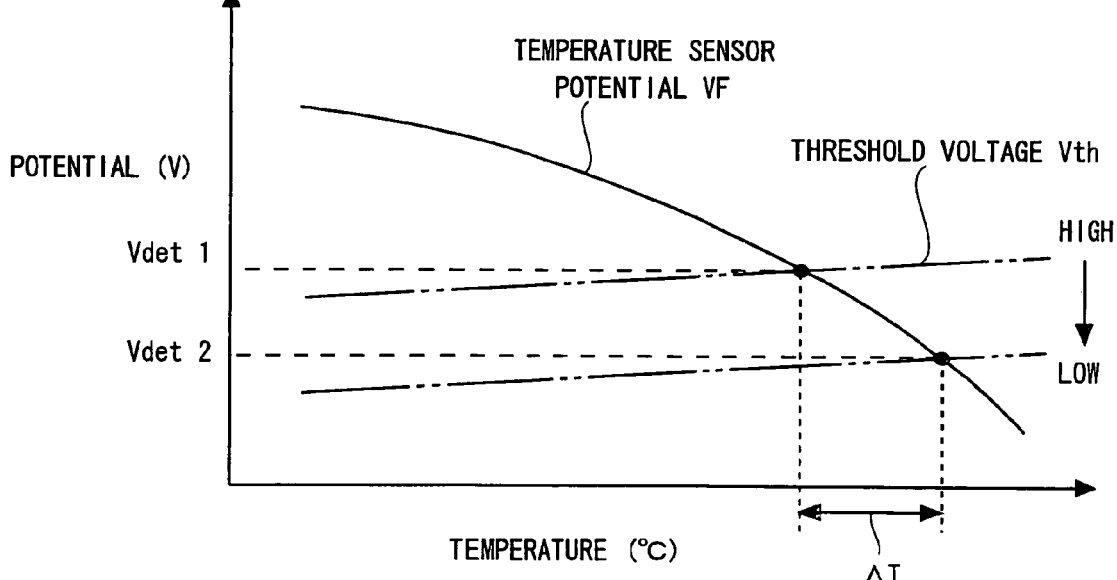
FIG. 6 is a graph showing temperature characteristics of the conventional temperature detection circuit of FIG. 5.

Next, effects of the present invention are described in more detail. FIG. 4 is a graph showing comparison results of variations in detection temperature Tdet between the first embodiment and the conventional temperature detection circuit shown in FIG. 5. In FIG. 4, the vertical axis represents the detection temperature Tdet (° C.), and the horizontal axis represents the threshold voltage Vth (V) of the inverter circuit.

As shown in FIG. 4, in the conventional temperature detection circuit, the detection temperature Tdet largely varies due to the threshold voltage Vth. In contrast, it is apparent that, in the temperature detection circuit 1 according to the first embodiment of the present invention, the variation ΔT in detection temperature Tdet is minimized even if the threshold voltage Vth varies.

As set forth above, according to the first and second embodiments, the NchMOSFET having the same characteristics as the NchMOSFET that defines the threshold voltage of the inverter circuit is also provided to the temperature sensor of the temperature sensor potential generating part. Hence, the variations in threshold voltage Vth of the NchMOSFET affect not only the inverter circuit but also the temperature sensor potential. Thus, it is possible to minimize variations of the detection potential Vdet at a point where characteristic lines of the temperature sensor potential VF and the threshold voltage Vth of the inverter circuit cross each other, namely, the detection temperature Tdet.

It is apparent that the present invention is not limited to the above embodiment that may be modified and changed without departing from the scope and spirit of the invention.

What is claimed is:

1. A temperature detection circuit, comprising:
    a potential generating part generating a potential corresponding to a detection temperature; and
    a temperature detection part detecting a temperature based on a generated potential in the potential generating part,
    wherein the temperature detection part is an inverter circuit that includes a first semiconductor device that is switched by the generated potential,
    wherein the potential generating part includes a constant current circuit, a diode supplied with a constant current from the constant current circuit, and a second semiconductor device having substantially the same threshold voltage as the first semiconductor device,
    wherein said constant current circuit, said diode, and said second semiconductor device are connected in series and wherein the potential is provided from a node between said constant current circuit and said diode.

2. The temperature detection circuit according to claim 1, wherein the temperature detection part is a resistive load type inverter circuit.

3. The temperature detection circuit according to claim 1, wherein the temperature detection part is a constant-current load type inverter circuit.

4. The temperature detection circuit according to claim 1, wherein the diode is part of a series of cascaded diodes.

5. The temperature detection circuit according to claim 1, wherein the first and second semiconductor devices are N-channel MOSFETs.

6. The temperature detection circuit according to claim 1, wherein the first and second semiconductor devices are manufactured based on the same design.

7. The temperature detection circuit according to claim 1, wherein the first and second semiconductor devices are manufactured through the same process.

8. The temperature detection circuit according to claim 1, wherein said second semiconductor device has a first terminal connected to said diode, a gate connected directly to said first terminal, and a second terminal connected to ground.

9. The temperature detection circuit according to claim 8, wherein said first semiconductor device has a gate connected to said node.

* * * * *